United States Patent Office 3,160,626
Patented Dec. 8, 1964

3,160,626
PSEUDOMERIZATION OF STEROIDAL SAPOGENINS
Peter Oxley, Nottingham, England, assignor to Boots Pure Drug Company Limited, Nottingham, England, a British company
No Drawing. Filed May 7, 1962, Ser. No. 192,974
Claims priority, application Great Britain, May 18, 1961, 18,174/61
13 Claims. (Cl. 260—239.55)

This invention relates to the preparation of intermediates in the manufacture of corticosteroids. In particular it relates to an improved process for the isomerisation of steroidal sapogenins.

It is well-known to prepare corticosteroids from steroidal saponins contained in plants such as Agave, Dioscorea and Sisal. The saponins are converted to sapogenins which are then isomerised, according to the following reaction, to give pseudosapogenins.

(Only the D ring of the steroid nucleus is shown)

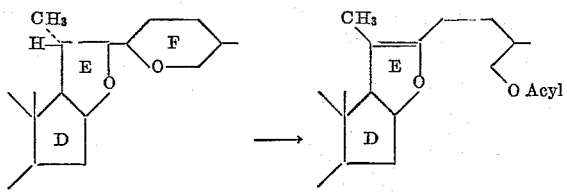

British specification No. 552,047 claims a process for isomerising and acylating a steroidal sapogenin other than sarsasapogenin by reacting the sapogenin with a lower aliphatic acid anhydride above 150° C.

British specification No. 749,697 claims a process for preparing pseudosapogenin esters from sapogenins or their esters by reacting them with an acid anhydride in the presence of a hydrohalide of a tertiary organic base at a temperature not greater than 150° C.

The most frequently used reaction employs acetic anhydride as the acylating agent, sometimes in the presence of a catalyst such as pyridine hydrochloride. Such isomerisations do not give quantitative yields and, indeed, it is difficult to isolate 80% of the theoretical yield of the diester.

The initial step in the pseudomerisation involves attack by an alkanoylium ion such as the acetylium ion on the oxygen atom in the F ring of the sapogenin. Acid halides such as acetyl chloride readily produce the required ions but, unfortunately, the yield of the pseudodiester is reduced in the presence of stoichiometric amounts of an acid halide. Acid anhydrides in the presence of certain catalysts give rise to the required alkanoylium ions and improved yields of the pseudodiester are obtained. With certain ion forming catalysts, however, side reactions occur and the overall yield of pseudosapogenin is reduced. For example, zinc chloride and ferric chloride may lead to complete destruction of the sapogenin if used as catalysts.

We have now discovered that when the acylating agent is either isobutyric anhydride or pivalic anhydride, the isomerisation is particularly efficient giving yields of over 90% of the diester; under certain conditions the yields are almost quantitative. When carried out in the presence of a suitable catalyst the isomerisation is completed in a very short time at temperatures between 150° C. and the reflux temperature. Furthermore if heating is allowed to continue after isomerisation is complete there is little degradation of the pseudosapogenin as may occur with other acylating agents such as acetic anhydride. We have found that suitable catalysts comprise boric acid, lithium bromide and hydrohalides of tertiary organic bases. Especially valuable are tertiary organic bases with a pK of 7 to 8, for example collidine and N-methylmorpholine.

It is an object of the present invention to provide an improved process for preparing pseudosapogenins and their derivatives. It is a further object of the invention to provide a process for the isomerisation of sapogenins which yields a higher purity of pseudosapogenin diester as the final product. It is also a further object of the invention to provide a process for the isomerisation of sapogenins giving a higher yield of pseudosapogenin diester.

The process according to the invention may be applied to any sapogenin containing one or more hydroxyl groups, which groups may be free or esterified with an organic acid. The preferred sapogenin for pseudoisomerisation is diosgenin or a 3-ester thereof but sapogenins such as hecogenin, smilagenin, sarsasapogenin, tigogenin and esters thereof may equally well be used. The hydroxyl groups of the sapogenin starting material may be esterified with an alkanoic acid such as formic, acetic, propionic isobutyric, pivalic or chloracetic acid or with an aromatic acid such as benzoic acid.

The reaction proceeds almost equally well with isobutyric or pivalic anhydride but for reasons of economy and availability we prefer to use isobutyric anhydride. Isomerisation is completed more quickly at higher temperatures and we generally prefer to ensure this by working at reflux temperature.

The catalyst may be boric acid, which forms mixed anhydrides with the acylating agent and thence the pivalylium or isobutyrylium ion. Lithium bromide forms the required ion from the anhydride via the acid bromide. The organic base catalysts are preferably heterocyclic bases such as pyridine, collidine, quinoline and N-methylmorpholine of which the especially preferred bases are those with a pK of 7 to 8 such as collidine and N-methylmorpholine. The base catalyses the reaction only in the form of its hydrohalide salts of which the preferred ones are the hydrobromide and hydriodide. The base may be added to the reaction mixture in the form of its hydrohalide or it may be formed in situ by the addition of a hydrohalide or source thereof in catalytic amounts.

Suitable sources of the hydrohalide include acid halides such as acetyl bromide, thionyl chloride and phosphorus tribromide and hydrohalides of organic bases such as methylamine.

The following none limitative examples illustrate our invention:

Example 1

A mixture of diosgenin acetate (50 g.), boric acid (100 mg.) and isobutyric anhydride (50 ml.) was heated at 170° C. for 1 hour. The reaction mixture was cooled to room temperature and pseudodiosgenin 3-acetate 26-isobutyrate crystallised in small needles. They were filtered off, washed with isobutyric anhydride and finally methanol to give pseudodiosgenin 3-acetate 26-isobutyrate, M.P. 121–124° C. Yield 48 g.

Example 2

A mixture of diosgenin isobutyrate (5 g.), boric acid (20 mg.) and isobutyric anhydride (10 ml.) was heated to 170° C. for 1½ hours. The reaction mixture was cooled and the crystals which formed were filtered off, washed with isobutyric anhydride and finally light petroleum (B.P. 60–80° C.) to give pseudodiosgenin di-isobutyrate, M.P. 108–110° C. Yield 4.6 g.

Example 3

A mixture of diosgenin benzoate (5 g.) boric acid (20 mg.) and isobutyric anhydride (10 ml.) was heated to 165° C. for 2 hours and then cooled. Crystals formed and were filtered off, washed with acetic anhydride and finally methanol to give pseudodiosgenin 3-benzoate 26-isobutyrate, M.P. 126–127° C. Yield 4.54 g.

*Example 4*

A mixture of diosgenin acetate (50 g.), N-methylmorpholine hydrobromide (1 g.) and isobutyric anhydride (50 ml.) was refluxed (ca. 185° C.) for 2 hours and then cooled. The pseudodiester crystallised and the crystals were collected by filtration, washed with acetic anhydride and finally methanol to give pseudodiosgenin 3-acetate 26-isobutyrate, M.P. 127–130° C. Yield 52.1 g.

*Example 5*

N-methylmorpholine hydrobromide (0.5 g.) was heated with isobutyric anhydride (50 ml.) until molten and then diosgenin acetate (100 g.) was added gradually at 150–160° C. maintaining a homogeneous solution before refluxing at 190° C. for 2 hours. The mixture was cooled to 100° C., diluted with acetic anhydride (100 ml.) and chilled. The crystals which formed were filtered, washed with acetic anhydride and finally methanol to give pseudodiosgenin 3-acetate 26-isobutyrate, M.P. 127–130° C. Yield 105.1 g.

*Example 6*

A mixture of diosgenin acetate (50 g.), N-methylmorpholine hydriodide (0.5 g.) and isobutyric anhydride (50 ml.) was refluxed for 2 hours, and the pseudodiester isolated as described in Example 4 to give pseudodiosgenin 3-acetate 26-isobutyrate, M.P. 126–129° C. Yield 51.5 g.

*Example 7*

The process of Example 6 was repeated but replacing the 0.5 g. of N-methylmorpholine hydriodide with N-methylmorpholine with hydrobromide (0.25 g.). The time of reflux was 4 hours.

Yield of pseudodiosgenin 3-acetate 26-isobutyrate 52.0 g., M.P. 128–131° C.

*Example 8*

The process of Example 7 was repeated with a refluxing time of 8 hours. The yield was 51.6 g., M.P. 128–131° C.

*Example 9*

A process was carried out generally as described in Example 6 but replacing the 0.5 g. of N-methylmorpholine with lithium bromide (0.25 g.). Yield 52.2 g., M.P. 127–130° C.

*Example 10*

Smilagenin acetate (5 g.) was refluxed with isobutyric acid (5 ml.) and N-methylmorpholine hydrobromide (50 mg.) for 2 hours. The mixture was chilled for 2 days and the crystals which separated were filtered off and washed with acetic anhydride and chilled methanol to give pseudosmilagenin 3-acetate 26-isobutyrate M.P. 75–76° C. Yield 2.77 g. The mother liquors were evaporated to dryness in vacuo and the residue was crystallised from acetic anhydride (4 ml.) to give a second crop, M.P. 76–77° C. Yield 1.98 g.

*Example 11*

A mixture of diosgenin formate (8.84 g.), isobutyric anhydride (10 ml.) and N-methylmorpholine hydrobromide (100 mg.) was refluxed for 2 hours and then chilled. The isolation method of Example 10 was used to give two crops of pseudodiosgenin 3-formate 26-isobutyrate.

1st crop—8.05 g.—M.P. 103–104° C.
2nd crop—1.12 g.—M.P. 100–102° C.

*Example 12*

A mixture of diosgenin acetate (22.8 g.), pivalic anhydride (25 ml.) and N-methylmorpholine hydrobromide (100 mg.) was refluxed for 2 hours (193–195° C.). The mixture was cooled and the crystals which formed were filtered off, washed with acetic anhydride and finally methanol to give pseudodiosgenin 3-acetate 26-pivalate, M.P. 138–142° C. Yield 25.5 g.

The mother liquors were evaporated to dryness, the residue was dissolved in acetic anhydride and a second crop of crystals, M.P. 136–140° C. in a yield of 0.88 g. was obtained.

I claim:

1. In a process for the preparation of a pseudosapogenin ester by heating a sapogenin compound selected from the group consisting of steroidal sapogenins and their esters together with a carboxylic acid anhydride, the step which comprises heating such sapogenin compound with an anhydride selected from the group consisting of isobutyric acid anhydride and pivalic acid anhydride as the carboxylic acid anhydride.

2. In a process for the preparation of a pseudosapogenin ester with carboxylic acids by heating a sapogenin compound selected from the group consisting of steriodal sapogenins and the esters thereof with carboxylic acids together with a carboxylic acid anhydride, the step which comprises heating such sapogenin compound with an anhydride selected from the group consisting of isobutyric acid anhydride and pivalic acid anhydride, as the carboxylic acid anhydride, in the presence of a catalytic amount of a catalyst selected from the group consisting of boric acid, lithium bromide and hydrohalides of tertiary organic bases.

3. The process of claim 2 in which the catalyst is a hydrobromide of a tertiary organic base with a pK of 7 to 8.

4. The process of claim 2 in which the catalyst is a hydriodide of a tertiary organic base with a pK of 7 to 8.

5. The process of claim 2 in which the catalyst is N-methyl morpholine hydrobromide.

6. The process of claim 2 in which the catalyst is N-methyl morpholine hydriodide.

7. The process of claim 2 in which the catalyst is collidine hydrobromide.

8. The process of claim 2 in which the catalyst is collidine hydriodide.

9. The process of claim 2 in which the reaction is performed at reflux temperature.

10. The process of claim 2 in which the catalyst is a hydrohalide of a tertiary organic base formed in situ by the addition of a catalytic amount of a tertiary organic base to the reaction mixture followed by addition of a catalytic amount of a hydrogen halide.

11. The process of claim 2 in which the catalyst is a hydrohalide of a tertiary organic base formed in situ by the addition of a catalytic amount of a tertiary organic base to the reaction mixture followed by addition of a catalytic amount of an organic acid bromide.

12. The process of claim 2 in which the catalyst is a hydrohalide of a tertiary organic base formed in situ by the addition of a catalyst amount of a tertiary organic base to the reaction mixture followed by addition of a catalytic amount of methyl amine hydrobromide.

13. A process for the preparation of a pseudodiosgenin carboxylic acid diester which comprises heating a diosgenin compound selected from the group consisting of diosgenin and the lower carboxylic acid esters thereof with isobutyric anhydride in the presence of a catalytic amount of N-methyl morpholine hydrobromide.

References Cited in the file of this patent
UNITED STATES PATENTS

| | | |
|---|---|---|
| 2,632,008 | Gould et al. | Mar. 17, 1953 |
| 2,755,277 | Wettstein et al. | July 17, 1956 |
| 3,005,817 | Fried et al. | Oct. 24, 1961 |